Jan. 12, 1965 W. L. ZOPFI 3,165,324
MOLDED PIPE JOINT SEAL
Filed Sept. 30, 1963
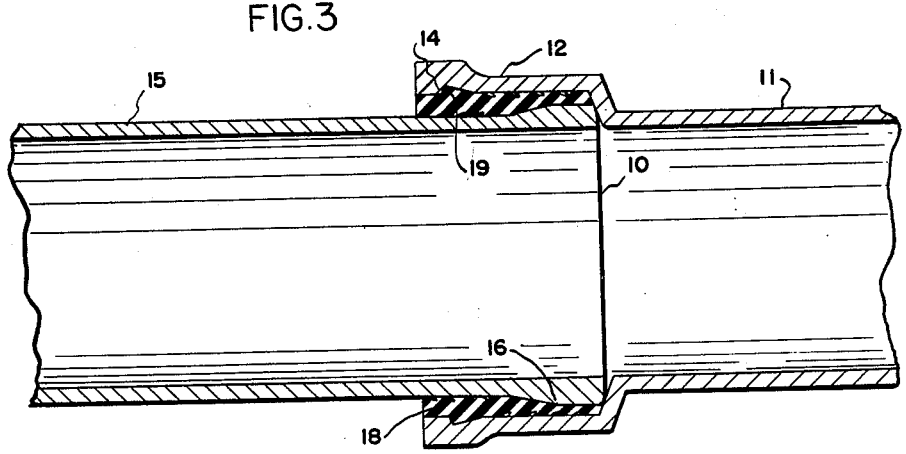
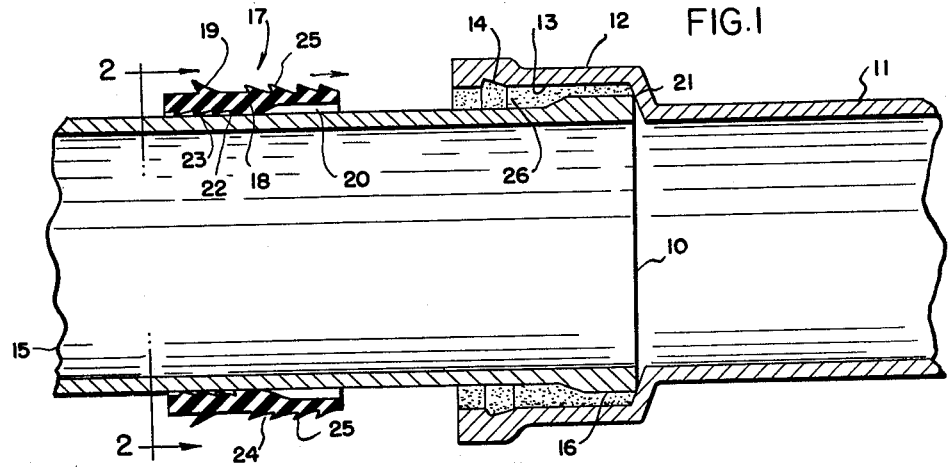
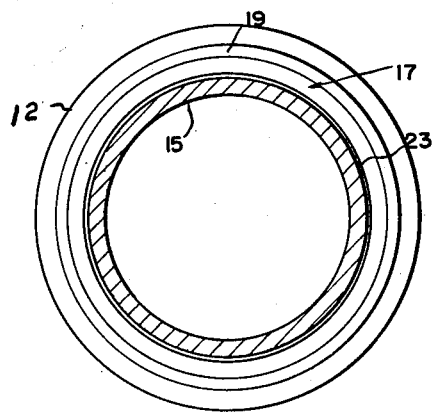
INVENTOR.
WILLIAM L. ZOPFI.
BY Cullen, Sloman & Cantor
ATTORNEYS.

United States Patent Office 3,165,324
Patented Jan. 12, 1965

3,165,324
MOLDED PIPE JOINT SEAL
William L. Zopfi, 2638 Hilton Road, Ferndale, Mich.
Filed Sept. 30, 1963, Ser. No. 312,425
5 Claims. (Cl. 277—209)

The present inventon relates to means for sealing the joint between a pair of pipes one of which has a bell end and the other of which is projected into the bell end in longitudinal alignment therewith.

Heretofore, considerable effort has been expended in the production of a suitable seal for interconnecting a pair of aligned soil pipes or other pipes of the same or of different diameters to render the same liquid tight.

It is an object of the present invention to provide a prefabricated joint which may be used between a pair of such pipes in the nature of a pre-molded ring-like flexible thin plastic body. Such body is adapted for assembly upon one of a pair of such pipes for sliding therealong close fitting engagement within the bell end of the assembled other pipe.

It is another object of the present invention to provide a pre-molded thin ring-like body of a plastic material such as polyvinyl chloride, rubber or neoprene and which not only seals the connection between a pair of such pipes but interlocks them in aligned relationship.

The present invention is an improvement over my co-pending patent application, Serial No. 217,735, on a molded pipe seal, filed August 17, 1962.

These and other objects will be seen from the following specification and claims in conjunction with the appended drawing in which:

FIG. 1 is a longitudinal section of a pair of aligned pipes one of which has a bell end for receiving the other pipe, with the pre-molded ring-like plastic body in disassembled relation.

FIG. 2 is a transverse section taken on line 2—2 of FIG. 1.

FIG. 3 is similar to FIG. 1 with the pre-molded plastic seal assembled.

It will be understood that the above drawing illustrates merely a preferred embodiment of the invention, and that other embodiments are contemplated within the scope of the claims hereafter set forth.

Referring to the drawings, FIG. 3 shows the completed and sealed joint between a pair of pipes hereafter referred to as first pipe 11 and second pipe 15. The pipes may be soil pipes constructed of cast iron, steel, fibre, a plastic material or any other suitable material, and may be of the same or different diameters. In the illustrative embodiment of the invention, cast iron soil pipes are shown, the first pipe 11 including bell end 12 of increased diameter adapted to receive the spiggot end 10 of second pipe 15.

The bell end 12 has an internal bore 13 spaced outwardly from second pipe 15; and in that bore and adjacent its outer end there is provided an undercut annular caulking or lead groove 14. The second pipe 15 at its spiggot end and upon the exterior thereof has an annular aligning bead 16, which in the preliminary assembly step of FIG. 1 is in engagement as at 21 with the inner end portion of the bell end of first pipe 11.

The present invention is directed to the means for sealing the joint between pipes 11 and 15. With particular reference to bell end 12 of first pipe 11 there is provided upon the aligned second pipe 15 a pre-molded thin ring-like seal 17 of flexible plastic material adapted for assembly upon and snugly slidable along second plug 15 into close fitting engagement within the bell end 12 in registry with its interior surface 13.

*The Seal*

The present seal 17 is in the form of a pre-molded thin ring-like body 18 of a flexible plastic material, as for example, polyvinyl chloride, though not limited thereto, since other materials could be employed, such as rubber or neoprene or other plastic materials. The polyvinyl chloride is a vinyl plastisol and is composed of a high molecular weight dispersion grade polyvinyl chloride resin, a silica type filler, mainly phthalate type plasticizers and stabilizers.

This construction provides in the seal 17, resistance to heat, fire, light, mildew, fungus and chemicals. The seal is stable under all weather conditions and is highly resistant to light, moisture and chemicals, such as sulphuric acid, hydrochloric acid, and nitric acid solutions, being relatively inert from a chemical viewpoint. The body 17 is flexible and under a durometer hardness scale, Shore A shows at 80° F. hardness No. 48 and at 10° F. hardness No. 56 (reading taken after five seconds hold).

The present seal 17 includes the elongated annular thin flexible plastic body 18. An annular undercut tapered sealing flange 19 is formed upon the outer trailing end of body 18, and when assembled, FIG. 3 is partly deformed and retainingly interlocked within lead groove 14 of bell end 12. Thus, the sealing ring or sleeve is anchored against outward disassembly from said bell end.

As best shown in FIG. 1, body 18 also has at its opposite leading end an internal annular groove 20 adapted to co-operatively receive aligning bead 16 and performs the further function of retaining the second pipe 15 against disassembly relative to the bell end of first pipe 11. This complete the interlock and longitudinal sealing alignment between pipes 11 and 15.

The present pre-molded body 18 also includes flexible yielding sealing means 23–25 which are molded into the body adjacent and along the bore towards the trailing end thereof, and upon the exterior annular surface of the said body at its forward end, FIG. 1, for yielding flexing and sealing engagement with the respective surfaces of the pipes when assembled as in FIG. 3.

Said flexible yielding sealing means are provided by a series of longitudinally spaced annular rearwardly tapered undercut grooves 22 formed in body 18 adjacent its bore and towards one end. These define a series of annular flexible tapered sealing fingers 23 adapted for co-operative deforming and sealing registry with the outer surface of pipe 15 when seal 17 has been assembled within the bell end 12, FIG. 3.

The sealing means also are provided by an additional series of annular longitudinally spaced tapered grooves 24 formed upon the exterior of body 18 toward its leading end to define a series of rearwardly extending annular tapered flexible sealing fingers 25. As shown in FIG. 3, these fingers are adapted for slight deformation and sealing cooperative engagement with bore 13 of bell end 12, to thus complete a hermetic and fluid tight seal between the two pipes in the assembled relationship shown. Body 18 and the sealing elements 23 and 25 are partly deformed and the entire assembly is under compression to complete the seal between the two pipes.

Referring to FIG. 1, seal 17 is snugly mounted over pipe 15. Before the seal is longitudinally projected to the position shown in FIG. 3, the interior surface 13 of bell end 12 has applied thereto a suitable adhesive resin, as at 26, which may also be applied to the exterior surface of pipe 15 over aligning bead 16 and adjacent portions of the said pipe. This adhesive cement or similar material improves the seal which is established between body 18 and the assembled pipes and for establishing a firm interlock therebetween.

Once this assembly has been completed, first it is noted that the ring-like seal 17 is anchored within bell end 12 in view of the interlock between sealing flange 19 and lead groove 14. At the same time, the aligning bead 16 of pipe 15 is received and anchored within corresponding recess 20 of body 18. In the assembled relationship shown, pipe 15 is retained against outward axial displacement relative to the bell end 12 of pipe 11.

The present sealing means may be employed between any type of clay pipe with a mechanical joint and any of the approved pipes as used for sewer and underground pumbing work such as cast iron soil pipe, copper pipe, transite pipe, or plastic pipe.

The adhesive layer 26 applied to the interior of the bore 13 of bell end 12 may be in the nature of an air drying adhesive. One example of such adhesive is known in the trade as "Pliobond" the trademark of and marketed by Goodyear Tire & Rubber Company. A similar adhesive material is also available and put out by the Reynolds Chemical Company.

Having described my invention, reference should now be had to the following claims.

I claim:

1. Means for sealing the joint between a first pipe having an enlarged bell end and a second pipe axially inserted into said bell end; the invention comprising:

a pre-molded thin ring-like tubular body of flexible plastic material, said body adapted for assembly upon and snugly slidable along the second pipe into close fitting engagement within the bell end of the first pipe, said bell end upon its interior and adjacent its open end having an annular undercut lead groove;

the inserted end of the second pipe having an axial annular aligning bead in engaging registry with said first pipe;

an annular undercut tapered sealing flange upon the trailing end of said body nested and retainingly interlocked within said lead groove and anchored against outward disassembly from said bell end;

there being an elongated internal groove in said body at its leading end co-operatively receiving said aligning bead and retaining the second pipe against disassembly relative to the bell end of the first pipe.

2. In the joint sealing means of claim 1, said body being axially elongated extending the full length of said bell end and compressively interposed between said bell end and second pipe effecting a hermetic and liquid seal therebetween.

3. In the pipe joint sealing means defined in claim 1, and flexible yielding sealing means molded into the body adjacent and along its bore and on the exterior annular surface of said body for yielding flexing and sealing engagement with the surfaces of said pipes respectively.

4. In the pipe joint sealing means defined in claim 1, and flexible yielding sealing means molded into the body adjacent and along its bore and on the exterior annular surface of said body for yielding flexing and sealing engagement with the surfaces of said pipes respectively, said plastic materials selected from the group consisting of polyvinyl chloride, rubber and neoprene.

5. In the pipe joint sealing means defined in claim 1, and flexible yielding sealing means molded into the body adjacent and along its bore and on the exterior annular surface of said body for yielding flexing and sealing engagement with the surfaces of said pipes respectively, said flexible yielding sealing means consisting of annular tapered undercut grooves formed in the body adjacent its bore and peripherally thereof defining tapered interior and exterior annular seealing fingers which deform when in compressive registry with said pipes.

References Cited in the file of this patent

UNITED STATES PATENTS

| 1,985,325 | Nathan | Dec. 25, 1934 |
| 2,501,943 | Jack | Mar. 28, 1950 |